(12) United States Patent
Aldridge

(10) Patent No.: US 7,958,998 B2
(45) Date of Patent: Jun. 14, 2011

(54) RECLOSABLE BLISTER PACKAGE ASSEMBLY

(75) Inventor: Allen Sydney Aldridge, South Orange, NJ (US)

(73) Assignee: Kraft Foods Global Brands LLC, Northfield, IL (US)

( * ) Notice: Subject to any disclaimer, the term of this patent is extended or adjusted under 35 U.S.C. 154(b) by 472 days.

(21) Appl. No.: 11/823,435

(22) Filed: Jun. 26, 2007

(65) Prior Publication Data

US 2008/0000794 A1 Jan. 3, 2008

Related U.S. Application Data

(60) Provisional application No. 60/817,058, filed on Jun. 28, 2006.

(51) Int. Cl.
*B65D 85/48* (2006.01)

(52) U.S. Cl. ......... 206/447; 206/467; 206/469; 206/800

(58) Field of Classification Search ................. 206/467, 206/469, 470, 800, 449, 447, 460, 256, 264; 220/257.1, 257.2; 229/123.3, 228
See application file for complete search history.

(56) References Cited

U.S. PATENT DOCUMENTS

| | | | |
|---|---|---|---|
| 3,151,800 A * | 10/1964 | Griese, Jr .................... 220/257.2 |
| 3,495,758 A * | 2/1970 | Wienecke, Jr. ............ 229/125.35 |
| 3,617,198 A | 11/1971 | Reid et al. |
| 3,673,133 A | 6/1972 | Schmidt |
| 3,768,969 A | 10/1973 | Kullman et al. |
| 3,913,298 A | 10/1975 | Cogliano |
| 4,099,650 A | 7/1978 | Immordino |
| 4,125,190 A | 11/1978 | Davie, Jr. et al. |
| 4,205,103 A | 5/1980 | Davis et al. |
| 4,244,901 A | 1/1981 | Wencley et al. |
| 4,306,548 A | 12/1981 | Cogliano |
| 4,340,141 A | 7/1982 | Fischer |
| 4,384,649 A | 5/1983 | Brodsky |
| 4,644,014 A | 2/1987 | Thomson et al. |
| 4,779,734 A | 10/1988 | Kydonieus |
| 4,830,185 A * | 5/1989 | Colletti ......................... 206/449 |
| 4,911,304 A | 3/1990 | Bunin |
| 4,925,035 A * | 5/1990 | Hunninghaus ................ 426/119 |
| 4,939,332 A * | 7/1990 | Hahn ............................ 219/734 |
| 4,962,849 A * | 10/1990 | Anderson ................. 206/45.24 |
| 4,974,729 A | 12/1990 | Steinnagel |
| 4,998,623 A | 3/1991 | Doull |
| 5,014,855 A * | 5/1991 | Roccaforte .................. 229/228 |
| 5,217,665 A | 6/1993 | Lim et al. |
| 5,251,757 A | 10/1993 | Relyea et al. |
| 5,277,920 A * | 1/1994 | Weaver, Jr. ................... 426/115 |
| 5,323,907 A | 6/1994 | Kalvelage |
| 5,332,096 A | 7/1994 | Battaglia |
| 5,585,412 A | 12/1996 | Natoli et al. |

(Continued)

FOREIGN PATENT DOCUMENTS

WO 2006/014443 2/2006

*Primary Examiner* — David T Fidei
(74) *Attorney, Agent, or Firm* — Hoffmann & Baron, LLP

(57) ABSTRACT

The present invention provides a reclosable blister package assembly for accommodating center-filled gum pieces. The package assembly includes a blister tray having an open face and a blister cavity for supporting the gum pieces. The blister tray includes a plurality of ribs within the blister cavity for separating the gum pieces. A cover overlies the blister tray and covers the open face of the tray.

16 Claims, 2 Drawing Sheets

U.S. PATENT DOCUMENTS

| | | | |
|---|---|---|---|
| 5,624,033 A * | 4/1997 | Arai et al. .................... 206/469 |
| 5,741,823 A | 4/1998 | Hsu |
| 5,839,574 A * | 11/1998 | Lorence et al. ............... 206/216 |
| 5,878,887 A | 3/1999 | Parker et al. |
| 5,915,559 A | 6/1999 | Hulick et al. |
| 6,071,580 A | 6/2000 | Bland et al. |
| 6,082,544 A | 7/2000 | Romick |
| 6,296,795 B1 | 10/2001 | Buck |
| 6,382,412 B1 | 5/2002 | Wood |
| 6,414,044 B2 | 7/2002 | Taylor |
| 6,681,935 B1 | 1/2004 | Lewis |
| 6,797,736 B1 | 9/2004 | Smiecinski et al. |
| 6,966,446 B1 | 11/2005 | Wise et al. |
| 7,005,457 B2 | 2/2006 | Loh et al. |
| 7,032,754 B2 * | 4/2006 | Kopecky ....................... 206/460 |
| 7,053,131 B2 | 5/2006 | Ko et al. |
| 7,093,716 B2 | 8/2006 | Intini |
| 7,113,101 B2 | 9/2006 | Petersen et al. |
| 7,150,335 B2 | 12/2006 | Sasano et al. |
| 7,159,717 B2 * | 1/2007 | Aldridge et al. ............... 206/449 |
| 2002/0036230 A1 * | 3/2002 | Chevalier et al. ............. 229/228 |
| 2003/0080021 A1 | 5/2003 | Kopecky |
| 2003/0118822 A1 | 6/2003 | Jahns et al. |
| 2004/0178112 A1 | 9/2004 | Snyder |
| 2005/0043423 A1 | 2/2005 | Schmidt et al. |
| 2005/0079352 A1 | 4/2005 | Glorioso et al. |
| 2005/0178692 A1 | 8/2005 | Chang |
| 2005/0183981 A1 | 8/2005 | Gelardi |
| 2005/0188649 A1 | 9/2005 | Hagen, Jr. |
| 2006/0047010 A1 | 3/2006 | O'Leary |
| 2006/0289328 A1 | 12/2006 | Hession |
| 2007/0034543 A1 | 2/2007 | Jones |
| 2007/0044431 A1 | 3/2007 | Greenwald et al. |
| 2007/0048413 A1 | 3/2007 | Glydon |
| 2007/0056873 A1 | 3/2007 | Elorz et al. |
| 2007/0084747 A1 | 4/2007 | Gherdan et al. |
| 2007/0102318 A1 | 5/2007 | Gelardi et al. |
| 2007/0151893 A1 | 7/2007 | Barndt et al. |

* cited by examiner

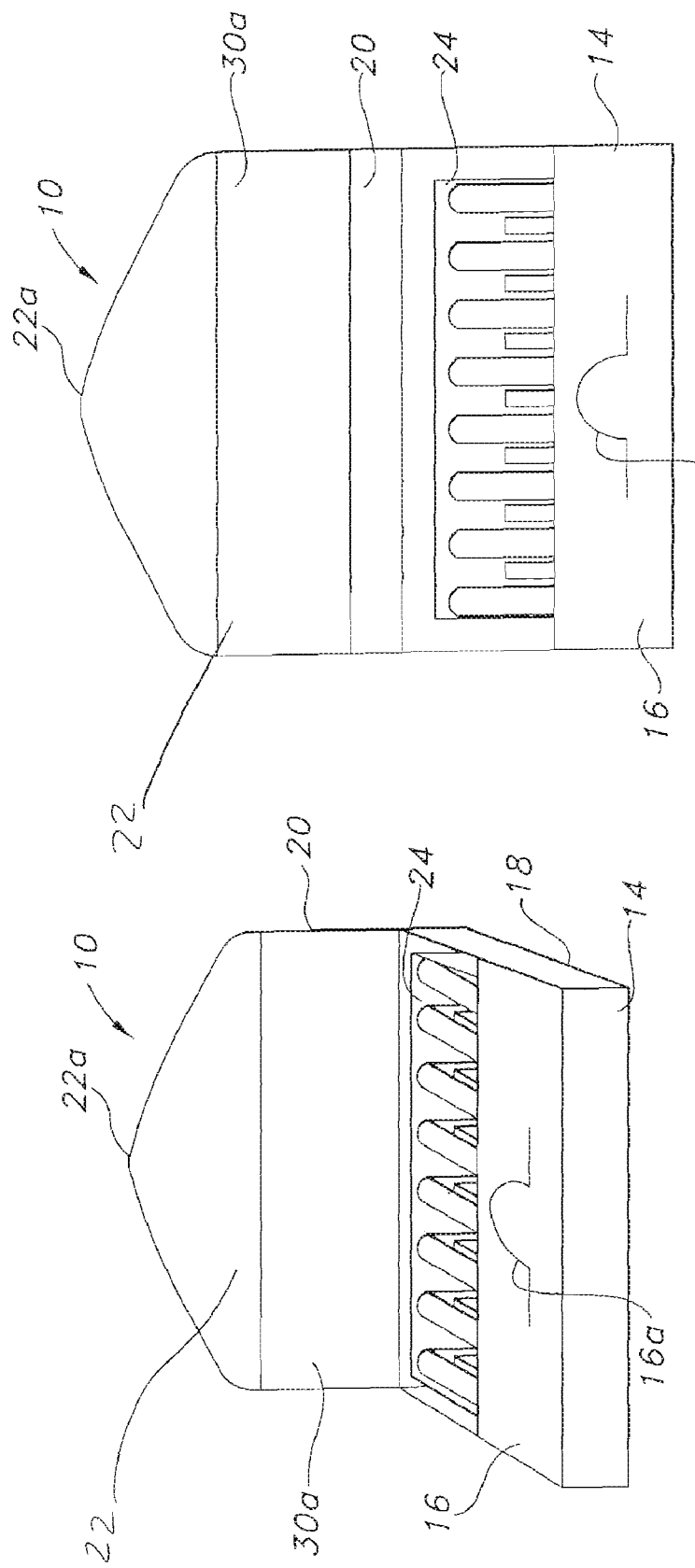

RECLOSABLE BLISTER PACKAGE ASSEMBLY

CROSS-REFERENCE TO RELATED APPLICATIONS

This application claims priority to U.S. Provisional Application No. 60/817,058, filed Jun. 28, 2006, which is incorporated herein by reference.

FIELD OF THE INVENTION

The present invention relates generally to a blister package for containing an array of consumable products preferably center filled gum pieces. More particularly, the present invention relates to a blister package assembly including a reclosable sleeve for exposing gum pieces contained in a blister tray.

BACKGROUND OF THE INVENTION

Blister packages are commonly used to support a variety of consumable products such as gum pieces. A conventional blister package includes a blister tray, having individual blisters each supporting an individual gum piece. The open face blister tray may be housed within a sleeve which slidably accommodates the blister tray. To access one of the gum pieces, the user slides the blister tray out from the sleeve to expose one or more of the blisters.

One type of gum product which is housed in conventional blister packages are center filled gum slabs which include a solid exterior and a liquid or soft interior. The blister package must provide adequate separation and structural protection to these center filled gum slabs so as to prevent crushing of the gum slabs thereby releasing the liquid center.

Many other forms of packaging are also known for supporting individual gum pieces such as sticks or slabs. Packages such as those having reclosable flaps which are openable to expose the gum pieces are prevalent. However, this type of package is not readily transferable for use with center filled gum pieces due to the particular nature of the product.

It is, therefore, desirable to provide an improved reclosable blister package which will accommodate center-filled gum pieces.

SUMMARY OF THE INVENTION

The present invention provides a reclosable blister package assembly for accommodating center-filled gum pieces. The package assembly includes a blister tray having an open face and a blister cavity for supporting the gum pieces. The blister tray includes a plurality of ribs within the blister cavity for separating the gum pieces. A cover overlies the blister tray and covers the open face of the tray. The cover has a removable portion for exposing the gum pieces. An openable sleeve surrounds the blister tray. The sleeve includes an openable flap adhesively secured to the removable portion of the covers. Opening of the flap causes the removable portion of the cover to be removed from blister tray.

In a preferred embodiment, the removable portion is defined by a score line which may be formed by a perforation or laser scoring.

BRIEF DESCRIPTION OF THE DRAWINGS

FIG. 1 is a perspective showing of the blister package assembly of the present invention.

FIG. 2 is a front plan view of the blister package assembly of FIG. 1.

DETAILED DESCRIPTION OF THE PREFERRED EMBODIMENT

Figure 3:
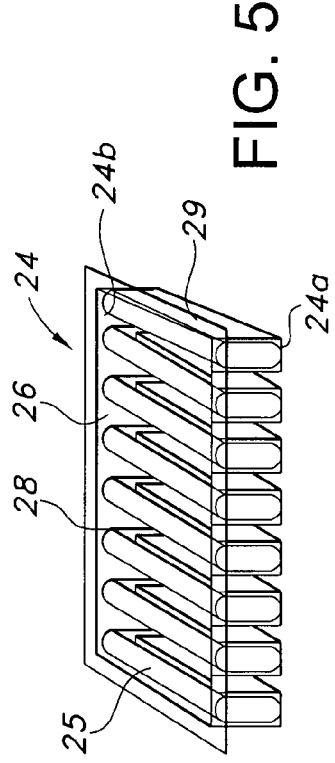
FIGS. 3-7 are various showings of the blister tray used in combination with the blister package assembly of FIGS. 1 and 2.
Figure 4:
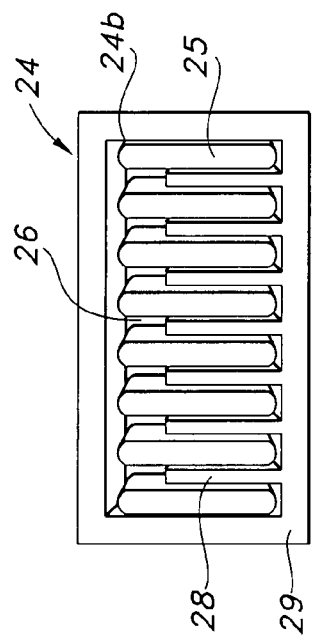
Figure 5:
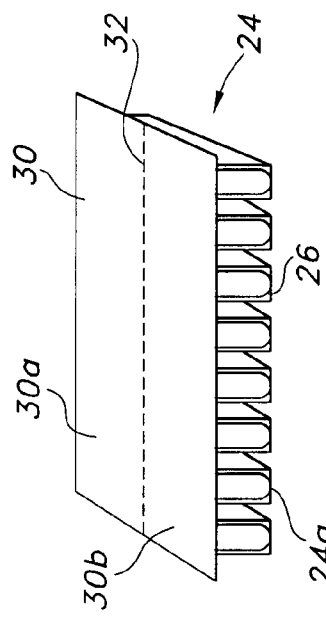
Figure 6:
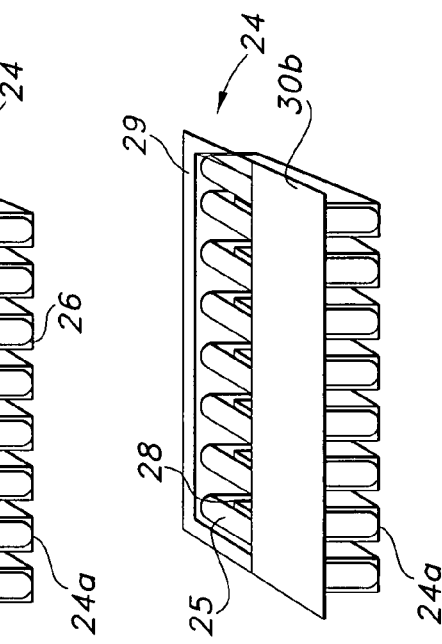

Referring to the figures, the present invention provides a blister package assembly 10 for supporting a plurality of center-filled gum pieces 12. The gum pieces may be individually wrapped. While center-filled gum pieces are shown in the preferred embodiment, it is contemplated that the present invention may be employed with any product which is desired to be separated including any type of confectionery or pharmaceutical product.

FIGS. 1 and 2 show the package assembly 10 including a package housing 14 which may be formed from a flat blank of paperboard or other suitable material and folded into the configuration shown in the figures. The package housing 14 includes a front wall 16, a back wall 18 and an openable flap 20 which may be closed over the front wall 16. Initially, the flap may be adhesively secured to the outer front surface of front wall 16 by a releasable adhesive. Thereafter, the flap 20 may be opened to access the gum pieces and reclosed by inserting the edge 22a of flap 22 into a slit 16a formed in the front wall 16. While one particular configuration of flap 20 is shown, others are within the contemplation of the present invention.

The package housing 14 is wrapped or otherwise placed around a blister tray 24 more fully shown in FIGS. 3-7. Blister tray 24 is similar to a conventionally formed blister tray having a bottom surface 24a and an opposed open face 24b. The blister tray 24 further includes a plurality of slotted compartments 26 each for supporting and separating an individual gum slab 25.

As shown in the Figures, the gum slabs 25 are aligned on their side edges. However, the gum pieces could also be aligned along the faces thereof. The blister tray 24 is formed to accommodate the particular arrangement desired.

Each compartment 26 is separated by a formed rib 28. The formed ribs 28 extend upwardly from the bottom surface 24a of the tray to the open top face 24b thereof.

In the preferred embodiment shown herein, the ribs 28 extend longitudinally across the tray partially along the length of the gums slabs. However, it is within the contemplation of the invention that ribs 28 may extend fully across the length of the gum slabs.

The blister tray includes an outer perimetrical planar rim 29 about open face 24b which supports thereover a cover 30. Cover 30 may be formed of foil or a paper/foil composite. The cover 30 is adhesively secured to the perimetrical rim 29 of the tray. The cover encloses the gum slabs within the blister tray and environmentally seals the gum slabs therein.

Figure 7:
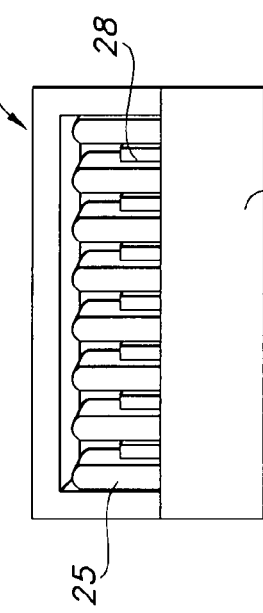

The cover 30 may include a transverse score line 32 thereacross. The score line forms two portions 30a and 30b or cover 30. The score line 32 extends partially through the cover 30 so as not to violate the environmental integrity of the cover. As shown in FIG. 7, the score line allows one portion of the cover to be removed from the other portion as will be described in further detail hereinbelow. The score line may be formed by laser scoring the cover. Other techniques such as perforating the cover may also be employed.

Referring again to FIGS. 1 and 2, it is contemplated that the inside surface of flap 22 may include adhesive thereon so as to adhere to portion 30a of cover 30. In this manner, when the openable flap 20 is opened it causes the cover 30 to tear along the score line 32 so that upper portion 30a can be removed from the blister tray. Such opening allows access to the gum slabs which are supported in the blister tray. Once one or more of the gum slabs are removed, the cover 30 may be reclosed by inserting edge 22a of flap 20 into the slit 16a in front wall 16. This recloses the blister tray and locks the cover in position.

The technique for removing a portion of the cover from the blister tray is substantially similar to that shown and described with respect to pending PCT Patent Application No. PCT/US05/23865, filed on Jul. 5, 2005, and entitled "RECLOSABLE CONSUMABLE PRODUCT PACKAGE ASSEMBLY", which is incorporated by reference herein for all purposes.

One feature of the present invention is that the ribs 28 extend upwardly from the bottom 24a of the tray 24 to the open top face 24b generally coplanar with the rim 29. The ribs 28 thereby provide crush resistance to the package assembly 10. This prevents the center-filled gum slabs from being crushed and thereby releasing the liquid center. Moreover, the ribs provide separation, preventing contact as between adjacent gum slabs.

What is claimed is:

1. A reclosable blister package assembly for accommodating center-filled gum pieces comprising:
   a blister tray having a bottom surface, an opposing open face and a blister cavity therebetween for supporting said gum pieces, said blister cavity having lower divided portions and upper undivided portions, said blister tray including a plurality of partially extending ribs within said blister cavity for partially dividing said blister cavity defining said lower divided portions and separating said gum pieces, each of said partially extending ribs extends upwardly from a portion of said bottom surface and longitudinally across a portion of said blister tray, said partially extending ribs extending along a portion of the length of each of said gum pieces;
   a cover including a removable portion, said removable portion overlying said blister tray and covering said open face of said tray, said removable portion is removable for exposing and accessing said upper undivided portions of said blister cavity and said gum pieces;
   an openable sleeve surrounding said blister tray, said sleeve including an openable flap adhesively secured to said removable portion of said cover such that said opening of said flap causes said removable portion of said cover to be removed from said blister tray and exposure of said upper undivided portions of the blister cavity.

2. A reclosable blister package assembly of claim 1 wherein said sleeve includes a front wall overlying said cover and adhesively secured thereto.

3. A reclosable blister package assembly of claim 2 wherein said flap is adhesively secured to said openable sleeve.

4. A reclosable blister package assembly of claim 1 wherein said sleeve is formed from a planar member.

5. A reclosable blister package assembly of claim 1 wherein said cover is formed of foil.

6. A reclosable blister package assembly of claim 5 wherein said removable portion is defined by a score line.

7. A reclosable blister package assembly of claim 6 wherein said score line is formed by a perforation.

8. A reclosable blister package assembly of claim 6 wherein said score line is formed by laser scoring.

9. A reclosable blister package assembly of claim 1 wherein said partially extending ribs are integrally formed within said blister tray and extend from a bottom surface coextensively with said gum pieces.

10. A reclosable blister package assembly of claim 1 wherein said cover is formed of a paper and foil composite.

11. A reclosable blister package assembly of claim 1 further including gum wrappers for individually wrapping each of said gum pieces.

12. A reclosable blister package assembly of claim 1 wherein said gum pieces are aligned along the edge of said gum pieces to allow for reducing the length of the package assembly.

13. A reclosable blister package assembly of claim 1 wherein said plurality of partially extending ribs extends fully across the length of said gum pieces.

14. A reclosable blister package assembly of claim 1 wherein said blister tray further includes a rim extending outwardly along the perimeter and planar with said open face.

15. A reclosable blister package assembly of claim 14 wherein said cover is adhesively secured to a portion of said rim.

16. A reclosable blister package assembly of claim 14 wherein said rim is coplanar with said ribs.

* * * * *